Dec. 20, 1966 G. W. WEBB 3,292,854

HEAT-STORAGE SYSTEM

Filed Aug. 24, 1964

INVENTOR.
George Warren Webb
BY
Roberts, Cushman & Grover
ATT'YS

United States Patent Office 3,292,854
Patented Dec. 20, 1966

3,292,854
HEAT-STORAGE SYSTEM
George Warren Webb, Revere, Mass., assignor to Comstock & Wescott, Inc., Cambridge, Mass., a corporation of Massachusetts
Filed Aug. 24, 1964, Ser. No. 391,562
2 Claims. (Cl. 236—9)

This invention relates to apparatus for storing heat derived from the sun or from electrical power at off-peak times when the rate is reduced or from other sources, for subsequent delivery to a place to be heated such as a room or other space, a water heater or other apparatus, and particularly to a system for controlling apparatus such as disclosed and claimed in the copending application of Richard E. Rice and William E. Whitney, S.N. 391,676, filed August 24, 1964.

Objects of the apparatus are to provide a control system which delivers heat at the desired temperature under all operating conditions, which always prevents the delivery of heat at excessive temperature, and which is durable and reliable in use.

According to this invention the apparatus comprises a storage chamber having a passageway therethrough for fluid to be heated, the passageway having an inlet and an outlet, a conduit for delivering heated fluid from said outlet to a place to be heated, a duct for supplying fluid to be heated to said inlet, a duct to supply tempering fluid to said conduit at a predetermined location, valve means for controlling the proportion of fluid flowing through said ducts, means for closing said valve when the flow of fluid through the unit stops, and thermostatic means for controlling said means. Preferably the valve-closing means comprises a motor and a switch actuated by the motor and the thermostatic means comprises a thermostat in said place to be heated. In the preferred embodiment the aforesaid thermostatic means also comprises a second thermostat in said conduit for controlling the temperature of the fluid delivered to said place, and means responsive to the first thermostat for controlling the second thermostat, the last means preferably comprising a heater for the second thermostat.

The aforesaid tempering fluid, when mixed with the heated fluid, keeps the resultant temperature down to the desired maximum. While the tempering fluid may be warmed more or less, as for example by a heat pump, usually it is unheated.

For the purpose of illustration a typical embodiment is shown in the accompanying drawings in which FIG. 1 is a diagrammatic view of the apparatus disclosed in the aforesaid application, showing the aforesaid valve in an operating position;

Figure 1:
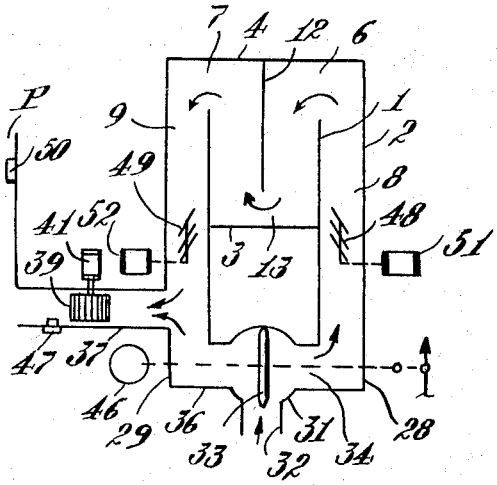

As more fully disclosed in the aforesaid application the apparatus comprises an enclosure having inner and outer walls 1 and 2, a bottom 3 and a removable top 4, the inner walls terminating short of the top 4 to provide openings 6 and 7 interconnecting the passageways 8 and 9 between the inner and outer walls with the space between the inner walls containing the storage material. The space between the inner walls is divided into two parts by means of a baffle 12 which divides the space except for an opening 13 at the bottom to permit circulation of air from one side of the baffle to the other. Leading to the passageway 8 is a duct 28 and leading to a conduit 37 is a duct 29. Disposed between these two ducts is a chamber 31 having an inlet 32 and containing a valve 33, this chamber communicating with duct 28 through an opening 34 and communicating with duct 29 through a duct 36.

Extending from the duct 29 is the conduit 37 containing a blower 39 driven by a motor 41. The valve 33 is actuated by motor 46 which is controlled by thermostat 47 in the conduit 37. Disposed in the passageways 8 and 9 are louvres 48 and 49 controlled by solenoids 51 and 52 which in turn are controlled by a thermostat 50 in the space to which conduit 37 delivers heated air. When the thermostat calls for heat the louvres open and when the circulation of air stops they close.

Figure 3:
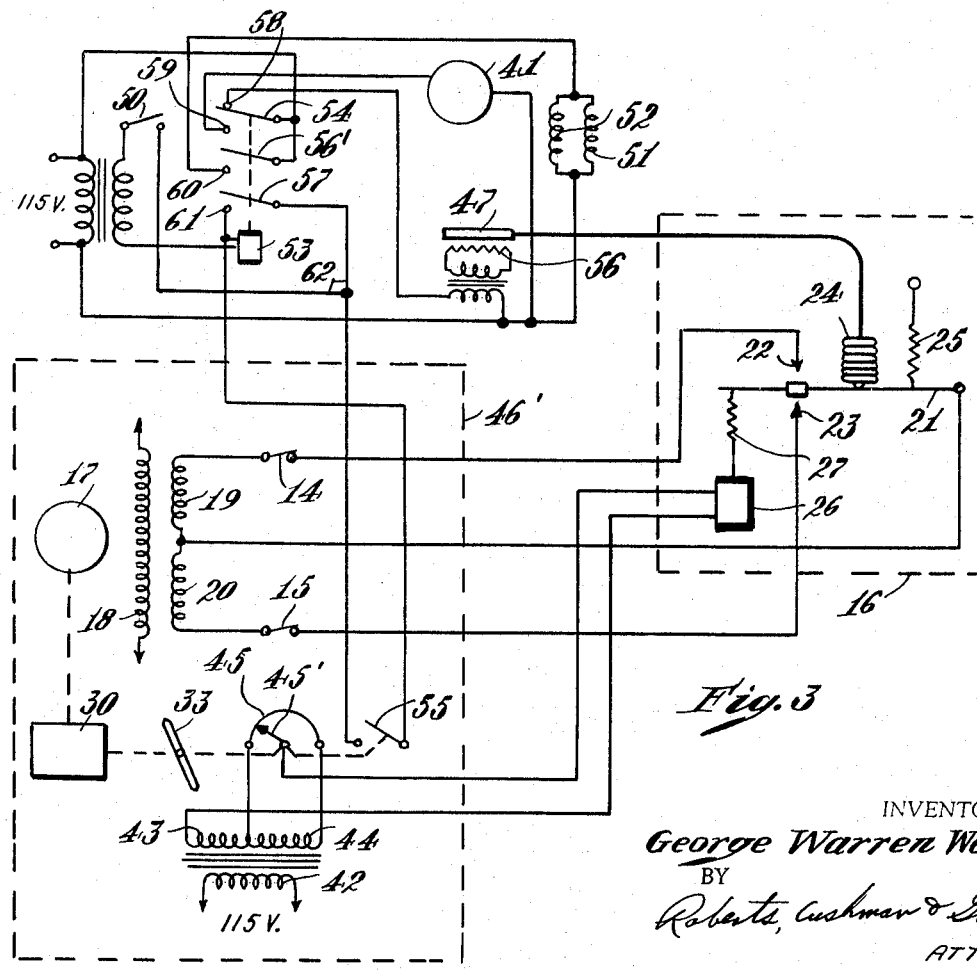
FIG. 3 is a circuit diagram showing how the parts are interconnected.

While there are many systems for controlling the aforesaid damper valve 33, the particular system chosen for the purpose of illustration comprises the Barber Colman MP 421 damper motor shown within the broken line 46' in FIG. 3, and the Barber Colman TP 204 thermostat surrounded by the broken line 16. The damper motor comprises a rotor 17, field winding 18, shading coil 19 to drive the rotor and damper valve 33 in a clockwise direction and shading coil 20 to drive the rotor and valve in a counterclockwise direction, and limit switches 14 and 15. The mid point of the shading coils is connected to switch 21 having stationary contacts 22 and 23 connected to the ends of coils 19 and 20 respectively. Switch 21 is controlled by bellows 24, spring 25, and a solenoid 26 connected to the switch through a spring 27. The bellows is actuated by the aforesaid thermostat 47 which is of the bulb type. The solenoid 26 is controlled by the rotor 17 through reduction gearing 30, and an adjustable potentiometer comprising a primary coil 42, secondary coils 43 and 44, a slide wire 45 connected across coil 44 and a slider 45' driven through gearing 30. When thermostat 47 falls below its set value, say 155° F., bellows 24 contracts, switch 21 engages contact 22, shading coil 19 is shorted, motor 46 turns valve 33 clockwise to reduce the proportion of cold air supplied through duct 29, thereby raising the temperature of the air supplied to the place P. When thermostat 47 rises above its set value, bellows 24 expands, switch 21 engages contact 23, shading coil 20 is shorted, motor 46 turns valve 33 counterclockwise to increase the proportion of cold air supplied through duct 29, thereby lowering the temperature of the air supplied to place P. To keep the temperature within a narrow range the displacement of switch 21 by the bellows 24 is opposed and partially offset by solenoid 26, switch 21 being flexible. Inasmuch as the slider 45' turns with the valve 33, the current supplied to the solenoid from the potentiometer is increased as the contact turns clockwise and decreased as it turns counterclockwise, as is well known in connection with Barber Colman MP 421 damper motors.

Figure 2:
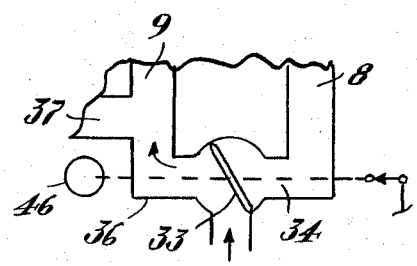
FIG. 2 is a similar view showing the valve in closed position.

When the apparatus stops delivering heat to place P the valve 33 should not be left in a clockwise position because, when starting again, it might result in initially delivering excessively hot air due to initial lag in the thermal elements. To guard against this, means are provided to turn the valve 33 to its extreme counterclockwise position (FIG. 2) at the end of each heating interval, the means comprising a switch 55 turning with the valve and a heating element 56 associated with the thermostat 47.

The system is controlled by the room thermostat 50 and a relay comprising a coil 53, three movable switches 54, 56' and 57 and four stationary contacts 58, 59, 60 and 61. When the room thermostat closes to call for heat, relay 53 is energized through switch 55 which is closed at the end of each heating cycle as hereinafter explained. When switch 54 disengages contact 58 it de-energizes heater 56 and when it engages contact 59 it starts blower 41. When switch 56' engages contact 60 the solenoids 51 and 52 are energized to open the louvres 48 and 49. When switch 57 engages contact 61 circuit 62 is closed to hold relay 53 energized after switch 55 opens.

When the room thermostat 50 opens to stop the supply of heat, relay 53 is de-energized and the switches 54, 56' and 57 return to the idle position shown in FIG. 3. When switch 54 disengages contact 59 it stops blower 41. When switch 54 engages contact 58 it energizes heater 56, which expands bellows 24, which moves switch 21 to contact 23 which moves valve 33 to its counterclockwise limiting position (FIG. 2) controlled by limit switch 15. Thus when the next heating interval begins valve 33 is in position to deliver only cold air to place P until the thermostat 47 has had time to function through bellows 24. Unless and until the valve 33 is in this position switch 55 remains open and the room thermostat cannot initiate a heating cycle.

If the apparatus is shut down by turning off the current the relay 53 is of course de-energized to open switches 54, 56 and 57 thereby immobilizing the blower 41. When current is again turned on while thermostat 50 is calling for heat the heater 56 is energized through circuit 50–58–59 to close the switch 55 and bring the valve 33 to the closed position shown in FIG. 2, but the blower cannot start until switch 55 is closed.

Thus the blower can never start except when the valve 33 is in position to deliver only cold air to place P.

From the foregoing it will be understood that the thermostatic means comprises the thermostat 50 in the place to be heated and a second thermostat 47 in the conduit for supplying heat to the place and a heater 56 responsive to the first thermostat for controlling the second thermostat.

It should be understood that the present disclosure is for the purpose of illustration only and that this invention includes all modifications and equivalents which fall within the scope of the appended claims.

I claim:

1. Heat-storage apparatus comprising a storage chamber having a passageway therethrough for fluid to be heated, the passageway having an inlet and an outlet, a conduit for delivering heated fluid from said outlet to a place to be heated, a duct for supplying fluid to be heated to said inlet, a duct to supply fluid to said conduit at a predetermined location, a blower for circulating fluid through said conduit, valve means for controlling the proportion of fluid flowing through said ducts, means for controlling said valve means including a first thermostat responsive to the temperature in said space, and means for causing said valve means to close said first duct when said first thermostat reaches a predetermined maximum temperature, said controlling means comprising a second thermostat responsive to the temperature of the fluid in said conduit, means for activating the second thermostat when the first thermostat reaches said predetermined maximum temperature, a motor controlled by said second thermostat, and a switch actuated by the motor to move into operative position when said first duct is closed, said switch causing said blower to start when said first thermostat reaches a predetermined minimum temperature.

2. Heat-storage apparatus according to claim 1 further characterized by a blower for circulating fluid through said ducts and means controlled by said switch for immobilizing the blower until said switch reaches operative position.

References Cited by the Examiner

UNITED STATES PATENTS

| | | | |
|---|---|---|---|
| 2,004,940 | 6/1935 | Greenlee | 236—13 X |
| 2,015,960 | 10/1935 | Norris | 236—11 |
| 2,102,324 | 12/1937 | Kronmiller | 236—9 |
| 2,211,573 | 8/1940 | McGrath | 237—8 |
| 2,266,217 | 12/1941 | Kingsland | 236—13 |
| 2,327,536 | 8/1943 | Locke | 236—13 X |
| 2,656,111 | 10/1953 | Lehane et al. | 236—13 X |

EDWARD J. MICHAEL, *Primary Examiner.*